UNITED STATES PATENT OFFICE.

CARL BOSCH, ALWIN MITTASCH, AND CHRISTIAN SCHNEIDER, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

HYDROGENIZATION AND DEHYDROGENIZATION OF COMPOUNDS CONTAINING CARBON.

1,215,334.  Specification of Letters Patent.  Patented Feb. 13, 1917.

No Drawing.   Application filed June 4, 1914.   Serial No. 842,958.

*To all whom it may concern:*

Be it known that we, CARL BOSCH, ALWIN MITTASCH, and CHRISTIAN SCHNEIDER, citizens of the German Empire, residing at Ludwigshafen-on-the-Rhine, Germany have invented new and useful Improvements in the Hydrogenization and Dehydrogenization of Compounds Containing Carbon, of which the following is a specification.

Our invention relates to the hydrogenization and dehydrogenization in the presence of a catalytic agent of compounds containing carbon, and to catalytic mixtures by means of which the said hydrogenization and dehydrogenization can be carried out rapidly, with certainty and at comparatively low temperatures. We have discovered that these advantages can be obtained by employing as the catalytic agent an intimate mixture of (1) one or more of the following metals: iron, nickel, cobalt and copper (which are for the purpose of this invention equivalents and which we hereinafter refer to as the catalytic metal), with (2) an oxygen-containing compound of boron. These oxygen-containing compounds of boron, which promote the activity of the catalytic metal, we refer to hereinafter as "promoters".

In order to obtain the advantages of this invention it is necessary to effect an intimate mixture of the catalytic metal and the promoter. If an oxid of boron be employed as the promoter, the oxid or carbonate of the catalytic metal can be mixed with such solid or dissolved oxid of boron (for instance, boric acid) and the mixture thereupon be heated and reduced, or a salt of the catalytic metal, for instance, the nitrate, may be mixed with a borate of the same metal, or of other suitable volatile, or non-volatile, base, and the mixture then be calcined.

It is particularly advantageous for the purpose of preparing a very active contact mass to prepare the catalytic metal from carbonaceous salts or mixtures of salts thereof, for instance, from carbonates or from formates. It is further often useful to add to the mixture, bodies of inorganic or organic nature, which act either as carriers, or as binding agents, or which increase the porosity of the contact mass. We mention, for instance, asbestos, charcoal and pumice. It is advisable, however, to avoid the introduction of bodies such as chlorin, sulfur, arsenic and lead, which may in the elementary form act as contact poisons, although the new contact mixtures according to the present invention are not so sensitive to the action of poisons as are the pure metals.

The catalytic metal can be employed either in a state of fine division, or in a more compact form, such as wire netting, or wool, or in sheet form.

The proportion of the components employed in the catalytic mixture may be varied considerably, even an addition of one per cent., or less, of the said promoters often producing favorable action.

In those cases in which reduction has to be resorted to in order to obtain the catalytic metal, such reduction is preferably carried out by means of pure hydrogen or other suitable agent at as low a temperature as possible, and if the catalytic mixture after having been reduced, has to be exposed to the air, it is generally advisable previously to drive away any excess of hydrogen by passing an indifferent gas such as carbon dioxid over the mixture and thus to avoid even superficial oxidation of the metal.

The catalytic mixtures, according to this invention, can be used for the hydrogenization and dehydrogenization of compounds containing carbon and are of particular value for the hardening of fats and fatty acids, but they can also be used for other purposes.

The catalytic reaction according to this invention can be carried out either at ordinary pressure or under increased pressure, for instance, above 50 atmospheres, and in most cases proceeds sufficiently rapidly at temperatures considerably below 180° C.

The following example will serve to illustrate further the nature of this invention, which, however, is not confined to this example.

*Example.*

Take freshly precipitated nickel carbonate and add from 10 to 20 per cent. of the weight thereof of ammonium borate, or potassium borate which has previously been dissolved in water. Then form the mass into any desired shape, dry and reduce it. The mixture can be employed for hydrogenizing oils and fats, either at the ordinary, or under increased pressure. For instance, the contact mass can be suspended in fish oil and hydrogen passed through the suspension at a raised temperature.

If it be desired to employ calcium borate as the promoter, the nickel carbonate can be treated with a borate as above described and then the requisite quantity of a solution of a calcium salt, for instance, calcium nitrate, can be added, to convert the boric acid radical into calcium borate. A similar procedure can be adopted in the case of the other insoluble borates.

Now what we claim is:—

1. The process of hydrogenizing compounds containing carbon by treating such compounds with hydrogen in the presence of a heated intimate mixture of nickel and an oxygen-containing compound of boron.

2. The process of hydrogenizing compounds containing carbon by treating such compounds with hydrogen in the presence of a heated intimate mixture of nickel and boron oxid.

In testimony whereof we have hereunto set our hands in the presence of two subscribing witnesses.

CARL BOSCH.
ALWIN MITTASCH.
CHRISTIAN SCHNEIDER.

Witnesses:
 CH. BECK,
 J. ALEC. LLOYD.